United States Patent
Huang (10) Patent No.: US 10,523,712 B1
(45) Date of Patent: Dec. 31, 2019

(54) STOCHASTIC QUANTILE ESTIMATION

(71) Applicant: Amazon Technologies, Inc., Reno, NV (US)

(72) Inventor: Wei Huang, Shoreline, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 231 days.

(21) Appl. No.: 15/604,484

(22) Filed: May 24, 2017

(51) Int. Cl.
    *H04L 29/06* (2006.01)
    *G06N 7/08* (2006.01)
    *G06F 17/17* (2006.01)
    *G06Q 30/02* (2012.01)

(52) U.S. Cl.
    CPC .............. *H04L 63/20* (2013.01); *G06F 17/17* (2013.01); *G06N 7/08* (2013.01); *G06Q 30/0202* (2013.01); *H04L 63/1425* (2013.01)

(58) Field of Classification Search
    CPC ..... H04L 63/20; H04L 63/1425; G06F 17/17; G06N 7/08; G06Q 30/0202
See application file for complete search history.

(56) References Cited

U.S. PATENT DOCUMENTS

| | | | | |
|---|---|---|---|---|
| 2009/0138238 A1* | 5/2009 | Bakshi | .................... | G06F 17/18 702/180 |
| 2010/0292995 A1* | 11/2010 | Bu | ........................ | G06Q 30/02 705/1.1 |
| 2011/0010337 A1* | 1/2011 | Bu | ........................ | G06F 17/18 707/609 |
| 2015/0379428 A1* | 12/2015 | Dirac | .................... | G06N 20/00 706/12 |
| 2015/0379429 A1* | 12/2015 | Lee | ........................ | G06N 20/00 706/11 |
| 2015/0379430 A1* | 12/2015 | Dirac | .................... | G06N 20/00 706/12 |
| 2016/0078361 A1* | 3/2016 | Brueckner | .............. | H04L 67/10 706/12 |
| 2016/0099963 A1* | 4/2016 | Mahaffey | ............ | H04L 63/0227 726/25 |

* cited by examiner

*Primary Examiner* — Baotran N To
(74) *Attorney, Agent, or Firm* — Hogan Lovells US LLP (57) ABSTRACT

A stochastic estimation approach can be used to provide percentile determinations for data, such as may be received on one or more data streams. A stochastic approach can analyze each received request on a data stream and update the percentile values accordingly, providing near real time adjustment of the percentile values. One or more scaling factors or adjustment boundaries can be applied such that the estimations do not fluctuate excessively in response to individual requests. The near real time updates enable actions to be taken on the data stream, such as to generate alarms or initiate request throttling. The stochastic approach is very light weight, requiring minimal resources and having minimal latency.

20 Claims, 7 Drawing Sheets

STOCHASTIC QUANTILE ESTIMATION

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. In some instances, applications can stream data from multiple sources that can be received to, and stored by, some of these resources. Due to the sheer volume of data, it can be difficult to determine trends or variations in the data in sufficient time to be able to make real-time adjustments or otherwise take action to maintain system stability and security.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in conventional approaches to managing data in a network environment. In particular, various embodiments provide for efficient, near real time data analytics and security enforcement. Data received on various data streams can be processed and stored to persistent storage. In many instances it can be desirable to determine information about the streams as the data is received. This can include, for example, information about the largest data requests or requests that otherwise might be outliers as far as processing, storage, or other such requirements. In other embodiments, information about average or minimum values might also be of interest. Approaches in accordance with various embodiments utilize a stochastic approach to percentile estimation that can be utilized to provide this information in a near real time fashion. The stochastic approaches discussed herein can analyze data for each received request and update the percentile (or quantile) values as appropriate. There can be scaling factors and adjustment boundaries set in place such that the estimations do not fluctuate excessively in response to requests or actions on the stream with unusual parameter values. The estimations can be adjusted in near real time in response to each request with minimal resource requirements, providing a very lightweight solution that provides results in sufficient real time such that actions can be taken on the data stream. These actions can include, for example, throttling customer requests or suspending access privileges, among other such actions. In some instances an alarm or notification can be generated causing a security administrator to review the activity, among other such options. The information can also be reviewed offline to adjust the scale factors or boundary factors as appropriate.

Various other such functions can be used as well within the scope of the various embodiments as would be apparent to one of ordinary skill in the art in light of the teachings and suggestions contained herein.

Figure 1:
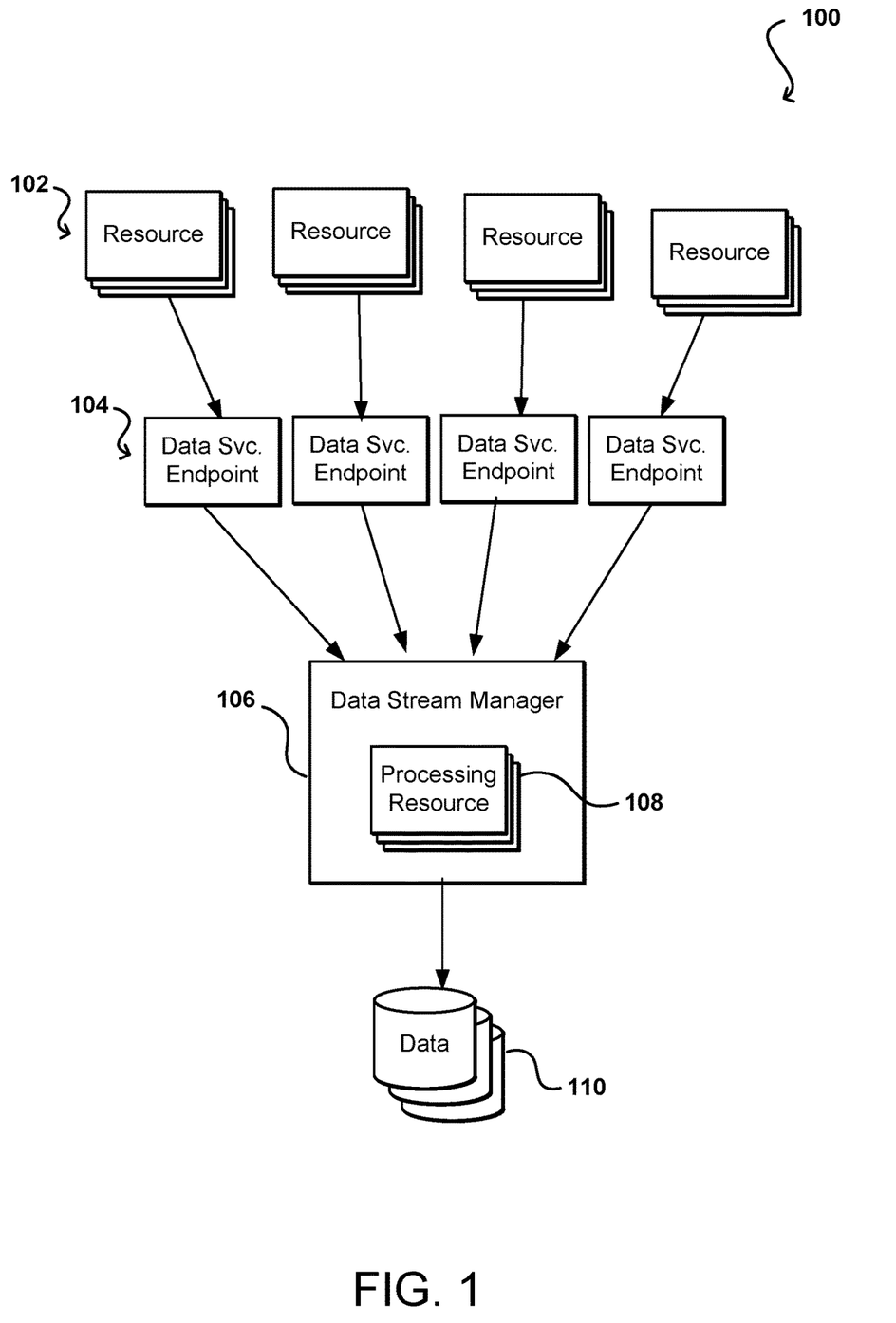
FIG. 1 illustrates components of data stream management architecture that can be utilized in accordance with various embodiments.

FIG. 1 illustrates an example data storage architecture 100 that can be utilized to store various types of data in accordance with various embodiments. In this example, there are various resources 102 that each generate data to be stored by one or more data resources 110 in a resource provider environment, or other such multi-tenant or shared-resource environment. In this example, each resource 102 can be a computing resource, such as a physical or virtual server, executing a copy of a particular application. Other computing devices executing other types of code can be utilized as well. The resources 102 can each send their data to a respective data service endpoint 104, such as a front end for a data service, designated application programming interface (API), or other such mechanism. In some embodiments, a pool of front end hosts will be provided as endpoints and the respective endpoint for a resource can be determined using a load balancer or other such mechanism. The data streams received to the endpoints 104 can be directed to a data stream manager 106, which can temporarily cache the data until the data can be processed by one or more appropriate processing resources 108. The processing resources 108 can perform tasks on the data, such as to format, transform, aggregate, order, or otherwise process the data such that the data can be stored to one or more appropriate data resources 110, such as may correspond to one or more data hosts. The processing resources can be part of the data stream manager 106 and/or associated with an external system, service, or application, among other such options.

The data stream manager 106 in one embodiment comprises a platform for streaming data using Web services, such as Amazon Kinesis, which provides for the loading of data from multiple streams into data repositories and provides for real time analysis of the received data. The manager can continually collect, store, and process very large amounts of streaming data, such as several terabytes per hour or more. Such a platform can also provide the ability for customers to generate custom applications to generate, process, and/or analyze the streaming data. The ability to process such data streams provides functionality such as to perform multi-stage processing, custom stream partitioning, real time metering, and durable storage for data in transit, among others. The data service endpoints 104 can comprise front ends or interfaces for a data service, such as Amazon CloudWatch. Such a service can provide for monitoring of the various resources 102 to obtain information as discussed above, with the resources then sending streams of log data that can be received to the data stream manager for transformation and storage into the appropriate data repositories 110. The log data transmitted from the resources can be sent in small batches and in near real time. While in some embodiments each log or data record can be sent in real time as it is generated or updated, in other embodiments the data will be batched in small batches based on time, size, number, or another such criterion and transmitted in batches for processing. Such an approach can add a small amount of latency but can also significantly reduce overhead and processing capacity utilization. Once the data, such as log data, is received and stored in the appropriate data repositories 110, a customer or entity with sufficient permission will be able to access the data. This can be desirable as the data can be streamed from multiple sources but then available from a single source through the appropriate interface.

Figure 2:
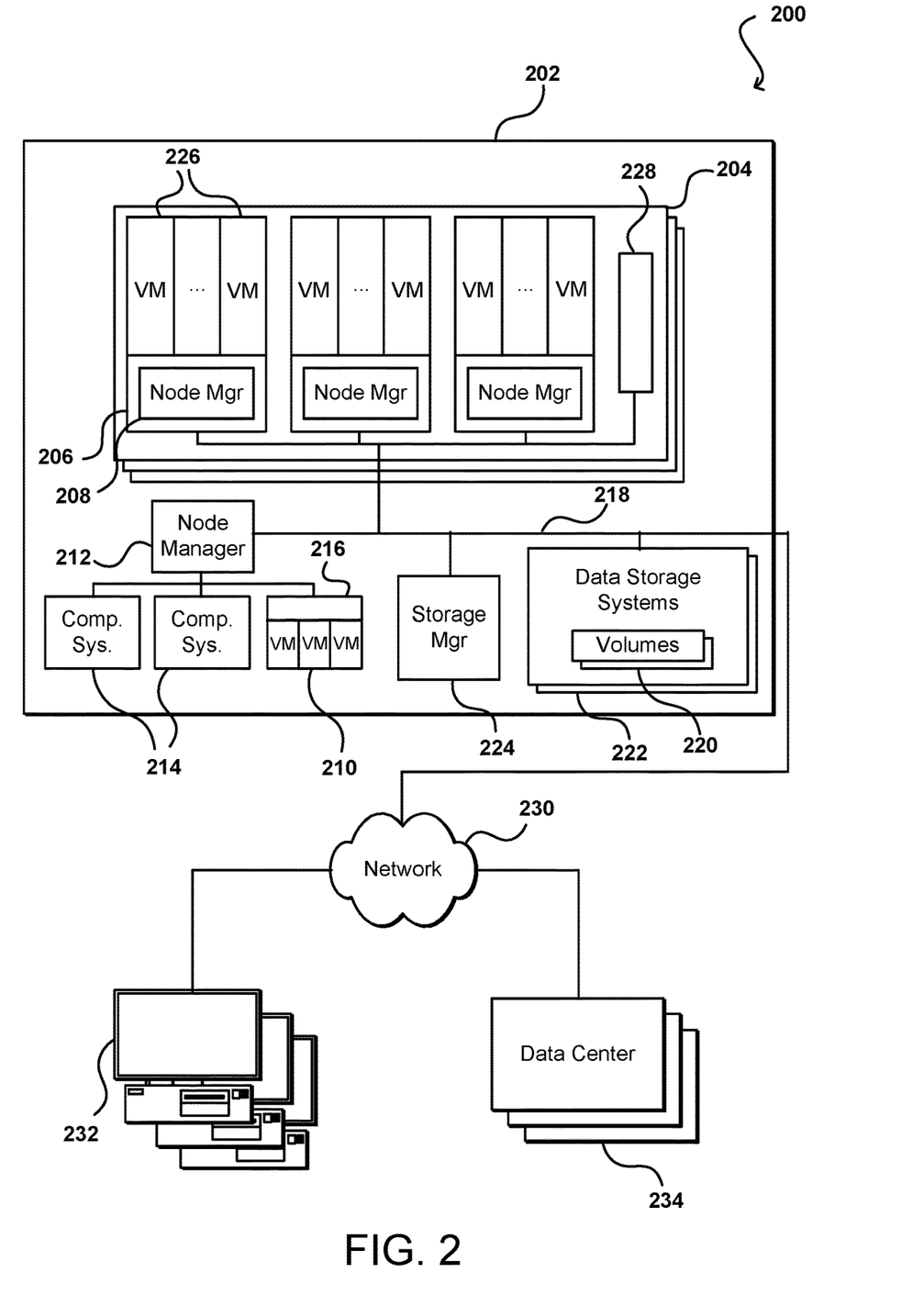
FIG. 2 illustrates an example environment in which aspects of the various embodiments can be implemented.

FIG. 2 illustrates an example network configuration 200 in which computing and data access operations can be performed, along with other such functionality, in accordance with various embodiments. This configuration can include components offered as part of a multi-tenant environment, or resource provider environment 202, wherein the components are provided by a resource provider, and customers pay for access and/or utilization of respective portions of those resources. In this example configuration, the resource provider environment includes a number of racks 204, each rack including a number of host computing devices 206. The host computing systems 206 each host one or more virtual machines. Each virtual machine can act as an independent resource node for executing one or more program copies or performing another such action or process for user data requests, I/O operations, etc. This example configuration also includes computer systems that execute a data storage system or service. The service can utilize a pool of multiple data storage systems, which each have local storage for use in storing one or more volumes 210. Access to the volume copies 210 is provided over an internal network to programs executing on various resource nodes. Thus, an application executing on a virtual machine instance on one of the computer systems 206 can be connected with one or more storage volumes 210 in the data storage systems. This is referred to herein as the instance being "attached" to the storage volume(s). In this example configuration, multiple computing systems are operable to execute various programs, applications, and/or services, and further operable to access reliable data storage, such as under the control of a data storage service. A data storage service can use multiple data storage systems in a data center, for example, to provide reliable, non-local data storage to executing programs or various other components, systems, or services. Multiple remote archival storage systems external to the data center may also be used to store additional copies of at least some portions of at least some data storage volumes.

In this example, a data center 202 includes a number of racks 204, each rack including a number of host computing devices 206, as well as an optional rack support computing system 228 in this example embodiment. The host computing systems 206 on the illustrated rack 204 each host one or more virtual machines 226 in this example, as well as a distinct node manager module 212 associated with the virtual machines on that host computing system to manage those virtual machines. One or more other host computing systems 216 may also each host one or more virtual machines 210 in this example. Each virtual machine 210 may act as an independent resource node for executing one or more program copies or performing another such action or process for user data requests, I/O operations, etc. In addition, this example data center 202 further includes additional host computing systems 214 that do not include distinct virtual machines, but may nonetheless each act as a resource node for one or more tasks being executed for a user. In this example, a node manager module 212 executing on a computing system (not shown) distinct from the host computing systems 214 and 216 is associated with those host computing systems to manage the resource nodes provided by those host computing systems, such as in a manner similar to the node manager modules 208 for the host computing systems 206. The rack support computing system 228 may provide various utility services for other computing systems local to its rack 204 (e.g., long-term program storage, metering, and other monitoring of program execution and/or of non-local data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 202 also includes a computing system 224 that executes a storage system manager module (such as for block-based storage) for the data storage service to assist in managing the availability of non-local data storage to programs executing on resource nodes provided by the host computing systems located within the data center (or optionally on computing systems located in one or more other data centers 234, or other remote computing systems 232 external to the data center). In particular, in this example the data center 202 includes a pool of multiple data storage systems 222, which each have local storage for use in storing one or more volume copies 220. Access to the volume copies 220 is provided over the internal network(s) 218 to programs executing on various resource nodes 210 and 214. As discussed in greater detail elsewhere, a data storage system manager module 224 may provide a variety of services related to providing non-local data storage functionality, including the management of user accounts (e.g., creation, deletion, billing, etc.); the creation, use and deletion of data storage volumes and snapshot copies of those volumes; the collection and processing of performance and auditing data related to the use of data storage volumes and snapshot copies of those volumes; the obtaining of payment from customers or other users for the use of data storage volumes and snapshot copies of those volumes; etc. In some embodiments, the storage system manager module 222 may coordinate with the node manager modules 212, 208 to manage use of volumes by programs executing on associated resource nodes, while in other embodiments the node manager modules may not be used to manage such volume use. In addition, in other embodiments, one or more storage system manager modules 224 may be structured in other manners, such as to have multiple instances of the storage system manager executing in a single data center (e.g., to share the management of non-local data storage by programs executing on the resource nodes provided by the host computing systems located within the data center), and/or such as to have at least some of the functionality of a storage system manager module being provided in a distributed manner by software executing on some or all of the server data storage systems 222 (e.g., in a peer-to-peer manner, without any separate centralized storage system manager module on a computing system 224).

In this example, the various host computing systems, server data storage systems, and computing systems are interconnected via one or more internal networks 218 of the data center, which may include various networking devices (e.g., routers, switches, gateways, etc.) that are not shown. In addition, the internal networks 218 are connected to an external network 230 (e.g., the Internet or another public data network) in this example, and the data center 202 may further include one or more optional devices (not shown) at the interconnect between the data center and an external network (e.g., network proxies, load balancers, network address translation devices, etc.). In this example, the data center 202 is connected via the external network 230 to one or more other data centers 234 that each may include some or all of the computing systems and storage systems illustrated with respect to data center 202, as well as other remote computing systems 232 external to the data center. The other computing systems 232 may be operated by various parties for various purposes, such as by the operator of the data center or third parties (e.g., customers of the program execution service and/or of the data storage service). In addition, one or more of the other computing systems may be archival storage systems (e.g., as part of a remote network-accessible storage service) with which the data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems 222 may further be interconnected with one or more other networks or other connection mediums, such as a high-bandwidth connection over which the storage systems 222 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 2 has been simplified for the purposes of explanation, and that the number and organization of host computing systems, server data storage systems and other devices may be much larger than what is depicted in FIG. 2. For example, as one illustrative embodiment, there may be thousands of computing systems per data center, with at least some of those computing systems being host computing systems that may each host fifteen virtual machines or more, and/or with some of those computing systems being data storage systems that may each store several volume copies. If each hosted virtual machine executes one program, a data center may execute as many as tens of thousands of program copies at one time. Furthermore, hundreds or thousands (or more) of volumes may be stored on the server data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional storage devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate API of a Web service layer of the system to provision a data volume and attach that volume to a data instance for that customer. The management system can be thought of as residing in a control plane, or control environment, with the data volumes and storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a storage system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

As part of the processing for a customer application, for example, at least some of these resources (as well as potentially external resources) can generate data that is to be stored by one or more data resources in the resource provider environment. This can include customer data or result data, but can also include other types of data such as state or log data. The log data can relate to activities performed by these resources, as well as to provide records of information such as processor utilization, latency values, request counts, memory usage, transaction volumes, error rates, and the like. Each of these resources can send data along one or more data streams to be received to a (logically) centralized location for storage by the appropriate data resource(s).

Figure 3:
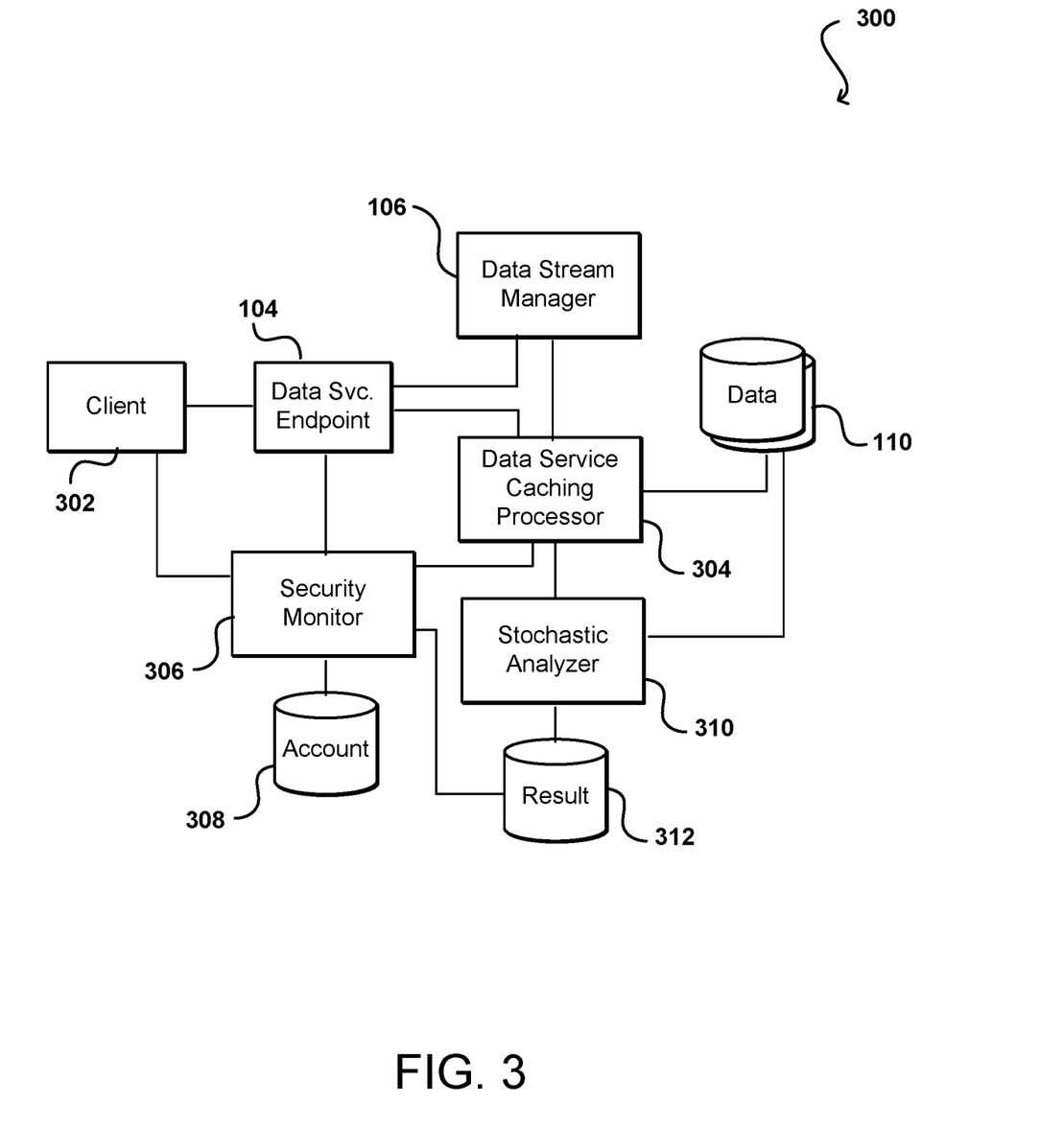
FIG. 3 illustrates an example configuration for analyzing data from a data stream management architecture that can be utilized in accordance with various embodiments.

FIG. 3A illustrates one example configuration 300 wherein a client device 302 is able to communicate with a data service endpoint 104, or other front end, to obtain the data of interest. It should be noted that reference numbers for similar elements may be carried over between figures for simplicity of explanation but that such usage should not be interpreted as a limitation on the scope of the various embodiments unless otherwise specifically stated. In order to obtain the data from the appropriate repository, the client device 302 can submit a request that can be received by the appropriate endpoint 104 or front end. The endpoint 104 can cause a call to a PUT log event that is processed by a caching processor 304 for the data service. The data, which was processed by the data stream manager 106 and written to the repository 110, can be returned to the client device 302 using a GET log event that is processed by the caching processor 304.

Similarly, an entity or system such as a security monitor 306, or security monitoring service, can obtain information about the data received on the stream to determine whether the data complies with various security policies or requirements. This can include, for example, obtaining the information from the repository 110 or obtaining information from a data service caching processor 304 using a GET command or other appropriate request. In some embodiments the security monitor 306 might send such a request to a data service endpoint 204, similar to the client device 302, for a user wanting to obtain similar information about the data stored to the repository.

In various systems, it may be desirable to have some analysis performed on the data stream that can be made available to the client device 302 and/or security monitor 306. This can include information about trends or occurrences in the data, such as sizes of data records or objects received, the rates at which records are received, the latency experienced in receiving records, and so on. Certain approaches take a bucketized approach to providing such information, wherein percentile information can be determined using counts for different buckets. For example, if the system is interested in the sizes of data objects (e.g., records, files, or documents) received on a stream, then the system can set up a series of buckets each corresponding to a range of sizes. A first bucket might be from a minimum size to a first size, such as from 1 MB to 10 MB, a second bucket between two sizes, such as 10 MB to 20 MB, and a third bucket from one of the intermediate sizes to a maximum size, such as 20 MB to 1 GB. Each document received counts towards the corresponding bucket for that document size. The distribution of counts amongst the various buckets can be used to estimate the percentile, or relative percentages, of documents that are received with the various sizes.

One downside to such an approach is that it requires a significant number of parameters. In order to obtain useful percentile information, it is necessary to utilize a large number of buckets. Smaller numbers of buckets can each cover a larger portion of the range, with no insight as to the variations or trends within that portion. Further each bucket may have three or more parameters that need to be tracked, as may include the minimum value of the bucket, the maximum value of the bucket, and the current count for that bucket. Such an approach also only provides a count received over a period of time, and still provides no insight as to the behavior of the data within a given bucket. The accuracy of the percentile information is limited to the size of the bucket, and an increase in the number of buckets increases the number of parameters to be tracked, which can increase resource cost and latency, among other potential drawbacks.

Accordingly, approaches in accordance with various embodiments utilize a stochastic approach that can provide percentile data in a fast and lightweight way that consumes very few resources. A user can specify percentiles of interest, and the system can provide this information in near real time. For purposes such as security, the system is typically most interested in the outliers or extreme cases. Thus, percentiles such as the $99^{th}$ percentile may be most of interest, and can provide the information most useful for real-time security monitoring and alarming, among other such applications. A user can also adjust the percentile values at any time and receive near real time updates.

In the system 300 of FIG. 3, a system such as a stochastic analyzer 310 can receive a request from a client device 302 or security monitor 306 to perform calculations for one or more specified percentiles. This can include, for example, a percentile of interest to a user or customer for monitoring purposes, or a percentile that is most likely to be associated with suspicious, abnormal, or prohibited behavior, among other such options. The stochastic analyzer can obtain the information directly from the repository 210 or through the data service caching processor 304 in some embodiments. In other embodiments, the stochastic analyzer can contact a service endpoint 204 or other such component to obtain information for a specific data stream. In some embodiments, the stochastic analyzer can establish a data tail that can cause a copy of the data, received on the data stream, to be forwarded to the analyzer from a relevant endpoint of the data service before it is stored in persistent storage. Various other approaches for receiving the data can be utilized as well in accordance with various embodiments. In other embodiments the stochastic analyzer can instead query the repository 210 and/or endpoint 204 for information about the recently received data, and need not necessarily receive copies of the actual data.

The stochastic analyzer can utilize a stochastic percentile approximation algorithm to analyze the data received on a specified stream. Stochastic approximation algorithms comprise recursive rules that can be used to solve various equations and determine optimizations. These algorithms are often used when a mathematical model is not available or sufficient for a complex system, but it may still be desirable to optimize performance. For specified values of the algorithm parameters, the performance of the system can be evaluated in order to determine optimum values for those parameters at peak performance. Stochastic approximation algorithms can attempt to locate extrema of functions that cannot be directly calculated. Examples of stochastic approximation algorithms include the Robbins-Monro algorithm and the Kiefer-Wolfowitz algorithm. Approaches in accordance with various embodiments can utilize stochastic approximation algorithms for percentile estimation.

Percentiles refer to ordered statistics of data, being closely related to concepts such as frequency distributions and histograms. The cumulative frequency distribution F( ) is commonly used to summarize the distribution of a data set S. The q-quantile ($0 \leq q \leq 1$) of dataset S is an element x such that a portion of the data in dataset S is less than or equal to x, with the remainder being greater than x, where the portion is determined by p*|S|. Then, for any value x, the cumulative frequency distribution is given by:

$$F(x) = \text{Number of values less than } x$$

The $q^{th}$ quantile Q(q) is then the inverse of F(x). Specifically, if dataset S has N elements, then the element x has the property:

$$x = Q\left(\frac{F(x)}{N}\right)$$

The following approach can be used to implement the stochastic quantile estimation algorithm. As mentioned, N can refer to the total number of items in dataset S, with n a time index between $1 \leq n \leq N$. The $n^{th}$ value in dataset S is given by $x_n$ and the target quantile value to be estimated is $q^*$, where $0 \leq q^* \leq 1$. Similarly, $s_n$ is the $q^*$ quantile estimation in dataset S at time n. The estimated quantile value $q_n$ is given by $0 \leq q_n \leq 1$, with the goal in at least some embodiments to have $q_n = q^*$. Scale factors $\alpha$, $\beta$, $\gamma$ can each also be constrained to values between 0 and 1. As part of the estimation process, values can be set as $q_1 = 0$ and $s_1 = x_1$. The estimation can then be executed as follows:

for n=2:N do
//Update the quantile value at step n
if $x_n < s_{n-1}$ then $$q_n = q_{n-1} \times (1-\alpha) + \alpha$$

else $$q_n = q_n \times (1-\alpha)$$

end if
//Determine the value of $\Delta$, its value is given by $-|s_{n-1}| \times \gamma \leq \Delta \leq |s_{n-1}| \times \gamma$ $$\Delta q = q_n - q^*$$

$$\Delta x = x_n - s_{n-1}$$

$$\Delta = \beta \times \Delta q \times |\Delta x|$$

$$\Delta = \min(\Delta, |s_{n-1}| \times \gamma)$$

$$\Delta = \max(\Delta, -|s_{n-1}| \times \gamma)$$

//Update the quantile estimation at step n $$s_n = s_{n-1} + \Delta$$

end for

In the above process, the percentile or quantile is estimated using a stochastic approach. In some embodiments quantile and percentile can be used interchangeably where a percentile is on a 100% scale and a quantile is on a scale from 0 to 1, such that a 99% percentile corresponds to a 0.99 quantile. In order to determine the percentage of incoming records that have sizes in the $99^{th}$ percentile, a stochastic approach can be used to estimate the number based on the incoming data stream in light of past performance. Such an approach is much lighter weight, and less resource intensive, than a bucketized approach as there are only a few parameters to be tracked for the approach.

In looking at the algorithm, there is an initialization stage where the percentile or quantile to be determined is identified, as well as the relevant data to be examined. The algorithm processes each request coming in, such that if there is only one request received over the period then the $100^{th}$ percentile would be the size of that request. Thus, during the initialization stage the initial quantile can be set to 0. We have an estimation of the quantile, and as data comes in we attempt to determine how this impacts the current value of the quantile. A size of 15 KB might have been estimated as the $10^{th}$ percentile, but based on data it can be determined that this size actually is closer to the $15^{th}$ percentile over that period. The percentile information can then be adjusted accordingly. As data is received, the estimation of the quantile value is updated. The new data can be compared with the current estimation. If the new data sizes are smaller than the current estimation, then the estimation of the quantile q can be adjusted by an appropriate amount. Thus, if the $10^{th}$ percentile estimation is 500K but all the data received is above that size then it can be appropriate to increase the percentile estimation. The approach can be conservative so as to not vary rapidly with data, as a couple outlier data points might otherwise overly impact the estimation. This approach can adjust the estimations based on the new data but only by a moderated amount as reflected in the algorithm. The gamma value in the algorithm acts as a bound to the amount of change in the current estimation for a given request or time stamp. In one embodiment, the maximum (or minimum) value is given by gamma times the current estimation value. The value of gamma can be determined experimentally and/or updated over time, such as may be learned through machine learning of another such process. The value of delta can be an estimate of how much the percentile should be changed based on the data. In addition to the bounds set, the delta can be modified by a scale factor (e.g., beta) in order to determine how much to adjust based not only on the received data but also a scale factor that is learned over time as far as how much variations in the data impact the estimations, so an appropriate percentage or fraction is applied, which then can be compared against the bounds to determine the actual adjustment to be made.

The scale factors (e.g., alpha, beta, and gamma) can be determined heuristically. Due to the large amount of data the scale factors are typically relatively small, such that a single data point will not unduly impact the percentile estimations. The estimates can be evaluated over time and the scale factors adjusted as appropriate in order to ensure reasonable accuracy of the stochastic algorithm-based approach. In other embodiments, an offline process can determine the accurate percentile values using the data received and then calculate the appropriate scale factors, and this can be performed periodically or as warranted due to variations in the estimations.

Such an approach can be used advantageously for other applications as well. For example, a resource provider environment might provide multiple host machines or servers (physical or virtual) that can be accessed by customers. If there is a group of 100 hosts able to receive requests, there might be a period of time between 1:00 p.m. to 2:00 p.m. where a first host A receives 10,000 requests, a second host B receives 2,000 requests, and a third host C receives 5,000 requests. The size of each request can vary. The provider of the various resources, or a customer to whom these resources are currently allocated, might be interested in receiving information about the usage of the various hosts and/or load on those hosts. For example the customer might want to see the $50^{th}$ percentile value for the sizes of requests received within that hour. The customer might also be interested in the $10^{th}$ and $99^{th}$ percentiles, in order to get information about the average, smallest, and largest requests that are received during that period of time. The largest requests, those in the $99^{th}$ percentile, are often those that cause issues with system availability, so it can be useful to monitor the sizes of those requests. Information about the smallest and average sizes can also be useful when determining how to allocate resources, and perform other such tasks as well. A stochastic approach as discussed herein can enable this information to be obtained in near real time with very little resource consumption, such that appropriate actions can be taken based on the quantile values obtained.

Further, significant changes in percentile values over time can be indicative of potentially malicious behavior. It might be the case that during the 1:00 to 2:00 p.m. hour the $99^{th}$ percentile value is around 1 MB. From 2:00 to 3:00 pm the $99^{th}$ percentile value might jump to over 10 MB. This can be a significant jump, and may trigger a security investigation or at least an adjustment in the allocation of resources, among other potential actions. Further, it is usually a small number of customers who contribute to such a change, so those customers can be quickly identified and their activity monitored or examined. In some embodiments, this information can also be attributed to a change in an application or service generating the requests, and such information can be helpful in making sure that the requests continue to be processed properly and resources allocated to support the change. In the event the system becomes unavailable, or overloaded, such information can also help to identify the issue as well as which systems may have been impacted, as well as the reason for the impact. While the approach can be used to determine information in an online and near real-time fashion in order to make system adjustments during operation, the approach can be applied offline as well in order to determine how to adjust the system for future periods of time based on the determined information, which can look at different time periods or percentiles, among other such options. While parameters such as size and frequency may be useful during operation, offline analyses can look at other parameters as well, such as may include order amounts, source location, item inclusion, and the like.

As mentioned, various actions can be taken in response to changes or large variations in quantile or percentile estimations. For example, an alarm or notification might be generated if the $99^{th}$ percentile estimation for request size changes rapidly or beyond a determined threshold. Similarly, the customers associated with those large requests might be determined and their activity monitored. For activity that falls outside a permitted range or type, the access granted to that customer may be modified, such that if multiple requests are sent on a customer account that are over a maximum size, or if the accumulated data transmission exceeds a maximum amount, then throttling or account suspension may be put in place for at least a period of time in order to mitigate the activity. In other embodiments, the action may include logging or the storing of other information that can be analyzed offline in order to determine whether additional action is warranted.

Figure 4:
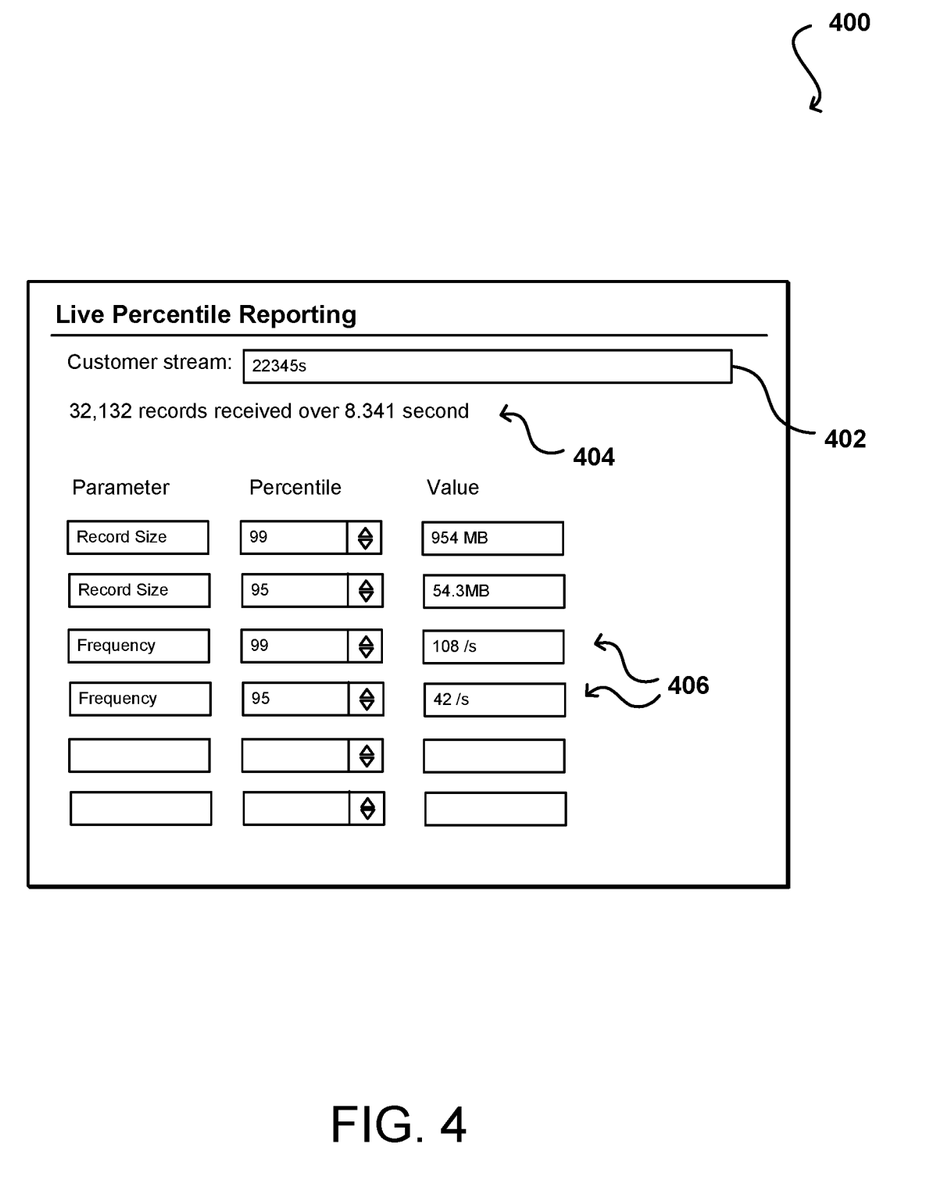
FIG. 4 illustrates an example interface displaying percentile information for a data stream that can be generated in accordance with various embodiments.

FIG. 4 illustrates an example interface 400 that can be displayed in accordance with various embodiments. In this example, a user can specify a data stream 402 or other data source or channel to be monitored. The interface can display information 404 about that stream, as may relate to the records or data received on the stream for a determined period of time. A user can specify parameters for which to receive information, and can specify the percentile (or quantile) to display for each parameter. Based on this, the system can display the values 406 for the percentiles and respective parameters. This can enable the user to view current values and determine whether specific actions should be taken. In some embodiments, recommended actions may be provided or accessible through such an interface as well. The user can adjust the parameters and percentiles as appropriate, assuming the user has permissions to access the relevant data.

Figure 5:
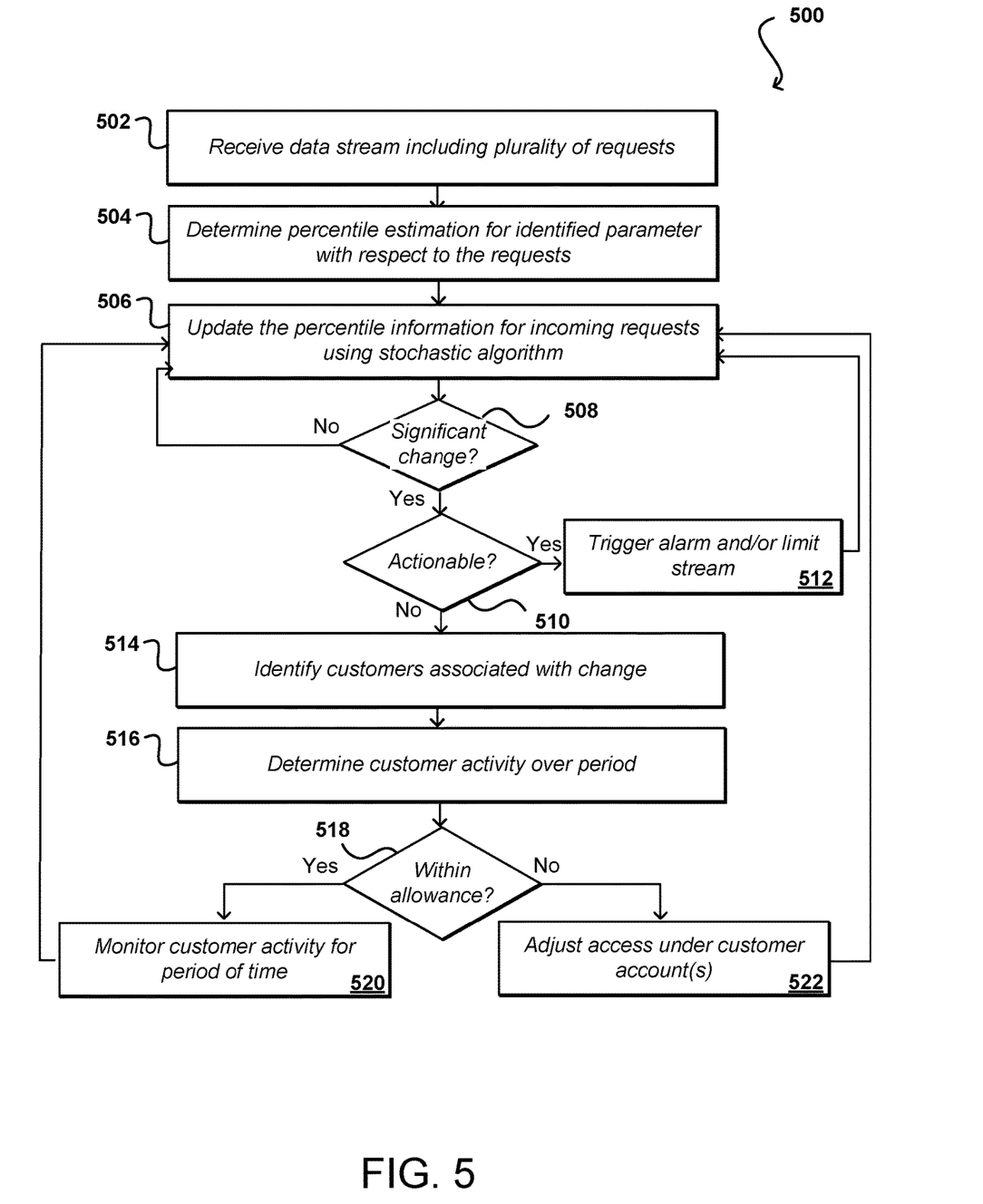
FIG. 5 illustrates an example process for tailing obtaining percentile information for a data stream and enforcing one or more security policies that can be utilized in accordance with various embodiments.

FIG. 5 illustrates an example process 500 for taking action based on real time percentile estimations that can be utilized in accordance with various embodiments. It should be understood for the various processes described herein that additional, fewer, or alternative steps can be performed in similar or alternative orders, or in parallel, within the scope of the various embodiments unless otherwise stated. In this example, data is received 502 on a specified data stream, where the data corresponds to a plurality of requests. The requests in this example are each associated with a customer account, although other requests can be processed using such a method as well. A percentile estimation can be determined 504 for the identified parameter to be evaluated with respect to the incoming requests on the stream. As mentioned, this could be an initial value based on expectations or prior periods, among other such options. Further, multiple estimations may be made for the same parameters or for multiple parameters within the scope of the various embodiments. As data for incoming requests is received on the stream, the percentile estimation can be updated 506 using one of a plurality of stochastic algorithm-based approaches as discussed and suggested elsewhere herein. A determination can be made 508 as to whether the change in estimation is a significant change, such as one that causes the estimation to exceed an allowable value or threshold. If not, the process can continue with estimations being updated for received data.

If the change is determined to be significant, another determination can be made 510 as to whether the change is an actionable change. These determinations can be part of a single determination in some embodiments. An actionable change could be, for example, one that causes the value to exceed a security threshold or allowable value, or one otherwise flagged as requiring some type of action be taken for the system or service as a whole. If determined to be actionable then an appropriate action can be taken, such as to trigger 512 an alarm and/or place one or more limits on the data stream, such as throttling or request limits, among other such options. If the change is not actionable but still significant, then the actions to be taken may instead focus on the sources of the requests that lead to the change. This can include, for example, identifying 514 the customers or other sources of the requests, as may be associated with specific accounts or roles, and determine 516 the relevant activity over a specified period of time, which could be the current period for the estimation or another appropriate period. A determination can be made 518 as to whether the relevant activity is within an allowance granted under the permissions for the customer or source. If so, no action may be taken but the activity of the identified customer may be monitored 520 for a period of time to ensure compliance with allowable activity. If the activity is outside the allowance, then the access granted under the relevant customer account(s) can be adjusted 522, such as to throttle requests for a particular account or deny access for a period of time, among other such options. In some embodiments the customer may first be notified before any action is taken.

Figure 6:
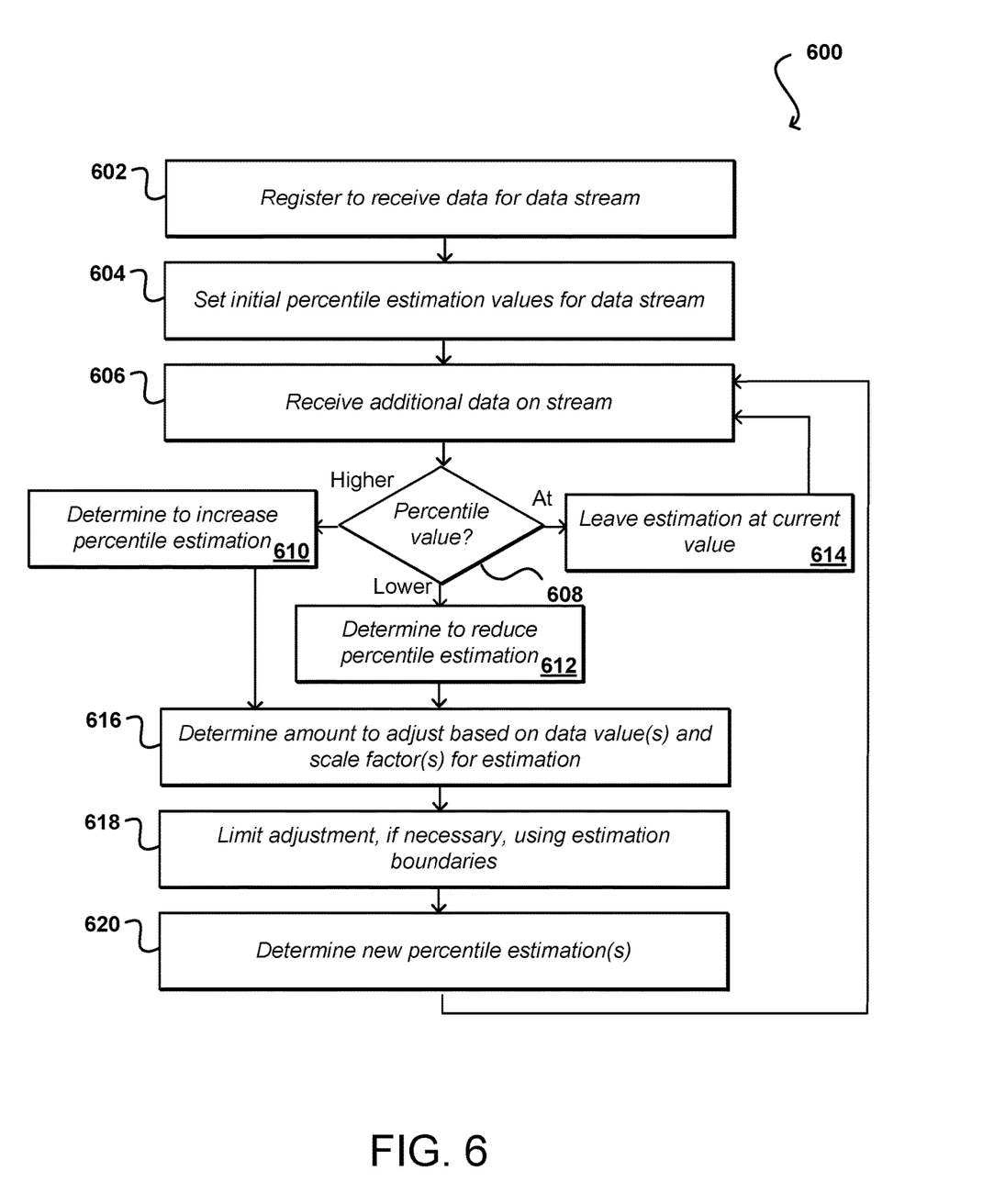
FIG. 6 illustrates an example process for determining percentile information using a stochastic approach that can be utilized in accordance with various embodiments.

FIG. 6 illustrates an example process 600 for making a stochastic estimation for an incoming data stream that can be utilized in accordance with various embodiments. In this example, the appropriate system or service for the process registers 602 to receive data for a specified data stream or other such source. The data can include the actual requests received or information for those requests. One or more initial percentile estimation values can be set 604 for the data stream, as may correspond to customer input or other such instructions. Data can then be received 606 on the relevant stream. For each request or other instance of data received, a determination can be made 608 as to how the data relates to, or impacts, the relevant percentile value(s). If the request is higher or above the current estimate then it can be determined 610 to increase the estimation. Similarly, if the request is below or lower than the current estimate then it can be determined 612 to lower the estimation. If the value(s) for the request is at or within a determined allowance of the current estimation then the estimation can be left at its current value with no adjustment made.

If it is determined to increase or decrease at least one percentile estimation, the amount of the adjustment can be determined 616 based on the relevant data values for the request and at least one scale factor. For example, if the $99^{th}$ percentile estimate is at 10 MB and a request is received that is 100 MB, the adjustment will not be based on the difference but instead some fraction of the different determined by the relevant scale factors. The factors can be determined using various approaches discussed herein, as may be based upon the amount of data and other such factors. Any adjustment to be applied can also be limited 618, as appropriate, using one or more estimation boundaries. As mentioned, it can be desirable to not allow the estimations to fluctuate significantly based on individual requests received, such that a boundary that is a percentage of the current estimate may be applied as a maximum or minimum value after the adjustment. Once the adjustment is determined that is within the boundaries for the adjustment, the new percentile estimation(s) can be determined 620 and applied for future processing on the data stream. Changes in the estimations can be analyzed to determine whether an action should be taken, such as is discussed with respect to the process of FIG. 5.

Figure 7:
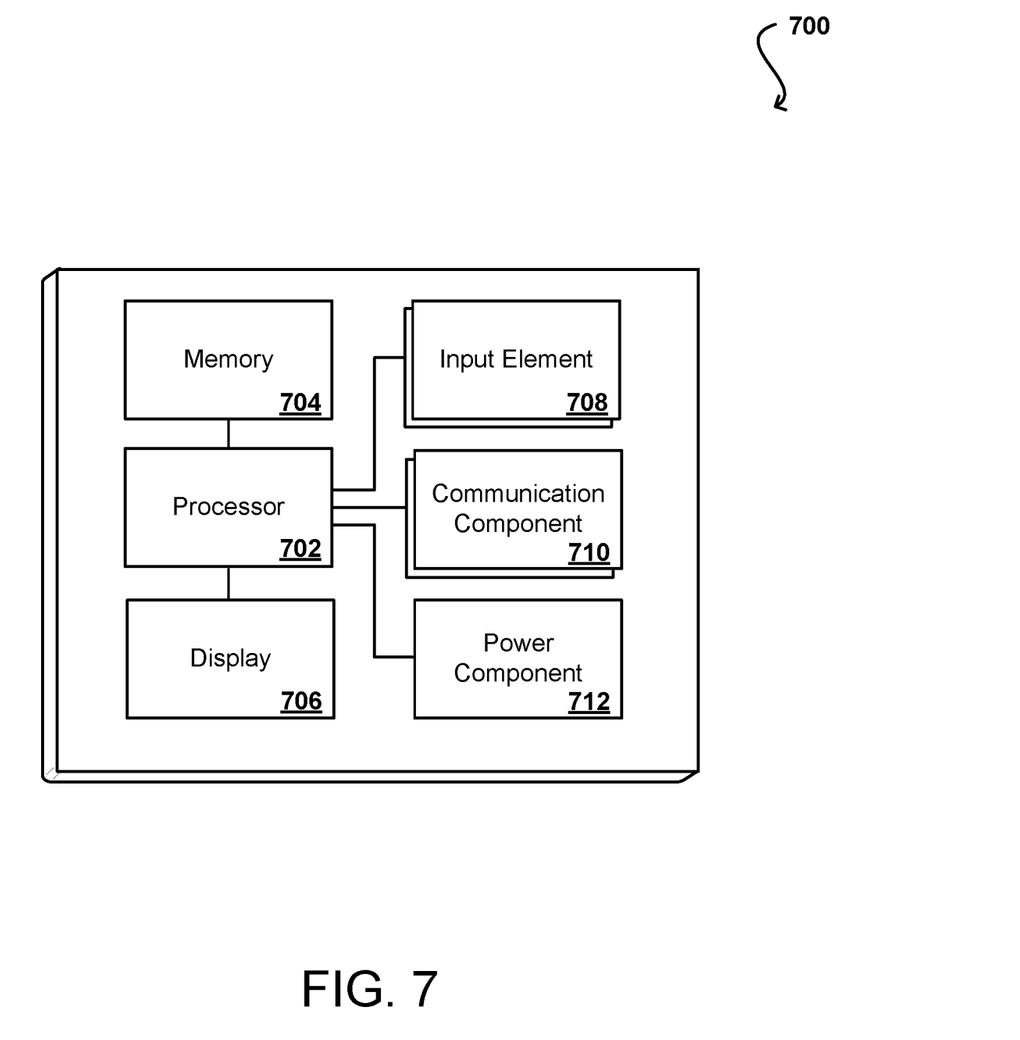
FIG. 7 illustrates components of an example computing device that can be used to perform aspects of the various embodiments.

FIG. 7 illustrates a logical arrangement of a set of general components of an example computing device that can be used to implement aspects of the various embodiments. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device may include some type of display element 706, such as a touch screen or liquid crystal display (LCD), although devices such as portable media players might convey information via other means, such as through audio speakers. In some embodiments, the computing device 700 can include one or more networking and/or communication elements 708, such as a Wi-Fi, Bluetooth, RF, wired, or wireless communication system. The device in many embodiments can communicate with a network, such as the Internet, and may be able to communicate with other such devices. In some embodiments the device can include at least one additional input component 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 712, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
registering to receive data for requests transmitted on a data stream;
determining an initial percentile estimate for a specified parameter relating to the requests received on the data stream;
receiving the data for a request received on the data stream;
analyzing the data request to determine a request value for the specified parameter;
determining a value difference between the request value and the initial percentile estimate;
calculating an adjustment to be applied to the initial percentile estimate using a stochastic percentile approximation algorithm, inputs to the stochastic percentile approximation algorithm including the value difference and at least one scale factor;
determining that a new percentile estimate, resulting from the adjustment being applied to the initial percentile estimate, satisfies at least one security action criterion for the specified parameter; and
performing a security action, associated with the at least one action criterion, with respect to the data stream.

2. The computer-implemented method of claim 1, further comprising:
determining a maximum adjustment range based at least in part upon a bounding factor and the initial percentile estimate; and
reducing the adjustment if the adjustment calculated using the stochastic percentile approximation algorithm falls outside the maximum adjustment range.

3. The computer-implemented method of claim 1, wherein performing the security action further comprises:
generating a security alarm indicating that the new percentile estimate satisfies an associated security action criterion.

4. The computer-implemented method of claim 1, wherein performing the security action further comprises:
determining at least one user submitting requests corresponding to the new percentile estimate; and
throttling requests from the at least one user for at least a specified period of time.

5. The computer-implemented method of claim 1, further comprising:
calculating the percentile value for the requests received on the data stream over a period of time using offline processing with the stochastic percentile approximation algorithm;
comparing the percentile value against the new percentile estimate; and
updating the at least one scale factor based at least in part on a difference between the percentile value and the new percentile estimate.

6. A non-transitory computer-readable medium storing program instructions that when executed on one or more processors cause the one or more processors to:

determine a first percentile estimate for a specified parameter associated with a series of requests received on at least one data stream;
receive information for a request, of the series of requests, received on the at least one data stream;
determine a request value for the specified parameter with respect to the request;
calculate, based at least in part on the request, a second percentile estimate using the request value as an input to a stochastic algorithm; and
determine whether to adjust at least one operational parameter relating to the at least one data stream based at least in part upon the second percentile estimate, the at least one operational parameter capable of being adjusted prior to a subsequent request being received on the at least one data stream.

7. The non-transitory computer-readable medium of claim 6, wherein the instructions when executed further cause the one or more processors to:
determine at least one scale factor to be applied for individual requests received on the at least one data stream; and
provide the at least one scale factor as an input to the stochastic algorithm, the at least one scale factor limiting an impact on current percentile estimates for the specified parameter in response to the individual requests.

8. The non-transitory computer-readable medium of claim 7, wherein the instructions when executed further cause the one or more processors to:
determine a maximum adjustment range based at least in part upon a bounding factor and the first percentile estimate; and
calculate the second percentile estimate further based on the maximum adjustment range with respect to the first percentile estimate.

9. The non-transitory computer-readable medium of claim 6, wherein the at least one operational parameter includes at least one of a maximum throughput, a permissible type of request, a request rate, a user permission, or a maximum request size.

10. The non-transitory computer-readable medium of claim 6, wherein the instructions when executed further cause the one or more processors to:
generate at least one of a security alarm, a request notification, or a log entry in response to the second percentile estimate satisfying at least one action criterion.

11. The non-transitory computer-readable medium of claim 6, wherein the instructions when executed further cause the one or more processors to:
receive specification of at least one of the specified parameter or the percentile by a customer associated with the data stream; and
provide, for display, a current estimate of the first percentile estimate and the second percentile estimate.

12. The non-transitory computer-readable medium of claim 6, wherein the instructions when executed further cause the one or more processors to:
calculate the percentile value for data received on the data stream over a period of time using offline processing by the stochastic algorithm;
compare the percentile value against the second percentile estimate; and
update at least one scale factor for the stochastic algorithm based at least in part on a difference between the percentile value and the new percentile estimate.

13. The non-transitory computer-readable medium of claim 6, wherein the specified parameter includes at least one of a request size, a type of request, a response latency, a request frequency, or number of requests including specified content.

14. The non-transitory computer-readable medium of claim 6, wherein the instructions when executed further cause the one or more processors to:
enable a new percentile estimate to be calculated in response to each request, of the series of requests, received on the at least one data stream.

15. A system, comprising:
at least one processor; and
memory including instructions that, when executed by the at least one processor, cause the system to:
determine a first percentile estimate for a specified parameter associated with a series of requests received on at least one data stream;
receive information for a request, of the series of requests, received on the at least one data stream;
determine a request value for the specified parameter with respect to the request;
calculate, in response to the request, a second percentile estimate using the request value as an input to a stochastic algorithm; and
determine to adjust at least one operational parameter relating to the at least one data stream based at least in part upon the second percentile estimate, the at least one operational parameter capable of being adjusted prior to a subsequent request being received on the at least one data stream.

16. The system of claim 15, wherein the instructions when executed further cause the system to:
determine at least one scale factor to be applied for individual requests received on the at least one data stream; and
provide the at least one scale factor as an input to the stochastic algorithm, the at least one scale factor limiting an impact on percentile estimates for the specified parameter in response to the individual requests.

17. The system of claim 16, wherein the instructions when executed further cause the system to:
determine a maximum adjustment range based at least in part upon a bounding factor and the first percentile estimate; and
calculate the second percentile estimate further based on the maximum adjustment range with respect to the first percentile estimate.

18. The system of claim 15, wherein the instructions when executed further cause the system to:
generate at least one of a security alarm, a request notification, or a log entry in response to the second percentile estimate satisfying at least one action criterion.

19. The system of claim 15, wherein the instructions when executed further cause the system to:
receive specification of at least one of the specified parameter or the percentile by a customer associated with the data stream; and
provide, for display, a current estimate of the first percentile estimate and the second percentile estimate.

20. The system of claim 15, wherein the instructions when executed further cause the system to:
calculate the percentile value for data received on the data stream over a period of time using offline processing by the stochastic algorithm;
compare the percentile value against the second percentile estimate; and
update at least one scale factor for the stochastic algorithm based at least in part on a difference between the percentile value and the new percentile estimate.

* * * * *